(12) United States Patent
Abadi et al.

(10) Patent No.: US 9,823,913 B2
(45) Date of Patent: Nov. 21, 2017

(54) METHOD OF ADDING LOCAL VARIABLES IN PLACE OF GLOBAL IN JAVASCRIPT

(71) Applicant: International Business Machines Corporation, Armonk, NY (US)

(72) Inventors: Aharon Abadi, Petach Tikva (IL); Moria Abadi, Petach Tikva (IL); Idan Ben-Harrush, Givat Elah (IL); Yishai A Feldman, Tel-Aviv (IL)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 14/957,626

(22) Filed: Dec. 3, 2015

(65) Prior Publication Data
US 2017/0161035 A1    Jun. 8, 2017

(51) Int. Cl.
G06F 9/45    (2006.01)

(52) U.S. Cl.
CPC .................................. G06F 8/443 (2013.01)

(58) Field of Classification Search
None
See application file for complete search history.

(56) References Cited

U.S. PATENT DOCUMENTS

| | | | |
|---|---|---|---|
| 7,584,452 B1 | 9/2009 | Johnson | |
| 7,689,979 B1 * | 3/2010 | Sawyer | G06F 8/4441 717/110 |
| 8,307,337 B2 * | 11/2012 | Chamieh | G06F 9/4428 717/113 |
| 8,429,604 B1 * | 4/2013 | Blas | G06F 8/75 717/109 |
| 8,453,132 B2 * | 5/2013 | Mannarswamy | G06F 8/4442 717/114 |
| 8,656,496 B2 | 2/2014 | Artzi et al. | |
| 8,893,099 B1 | 11/2014 | Leung | |
| 2003/0041312 A1 * | 2/2003 | Fueki | G06F 15/7867 717/100 |
| 2003/0140336 A1 * | 7/2003 | Kawahito | G06F 8/443 717/154 |
| 2004/0015918 A1 * | 1/2004 | Kawahito | G06F 8/4441 717/151 |
| 2006/0161897 A1 * | 7/2006 | Biberstein | G06F 11/3632 717/124 |

(Continued)

OTHER PUBLICATIONS

Abadi et al., A Parallel On-Demand Algorithm for Computing Interprocedural Dominators, © 2014 IEEE.*

(Continued)

*Primary Examiner* — Insun Kang

(57) ABSTRACT

The present invention, in some embodiments thereof comprises a computer implemented method of detecting global variables in JavaScript code, and adding local variables in place of the global variables, comprising receiving a JavaScript code containing at least one of a plurality of globally defined functions, identifying at least one of: one or more confined global variables which receive a value within a first JavaScript scope wherein the value is not referenced outside of the first JavaScript scope, and one or more repeating global variables accessed repeatedly within a second JavaScript scope, and adding local variables in place of at least one of the confined global variables and the repeating global variables.

20 Claims, 5 Drawing Sheets

(56) References Cited

U.S. PATENT DOCUMENTS

| | | | | |
|---|---|---|---|---|
| 2007/0226683 A1* | 9/2007 | Stoodley | ................ | G06F 8/443 |
| | | | | 717/106 |
| 2009/0049437 A1* | 2/2009 | Woersching | ............. | G06F 8/54 |
| | | | | 717/165 |
| 2012/0084761 A1* | 4/2012 | Maeda | ................... | G06F 8/433 |
| | | | | 717/132 |
| 2012/0311533 A1 | 12/2012 | Fanning et al. | | |
| 2012/0311546 A1* | 12/2012 | Fanning | ................... | G06F 8/75 |
| | | | | 717/136 |
| 2013/0275954 A1* | 10/2013 | Zhang | .................. | G06F 8/4435 |
| | | | | 717/154 |
| 2016/0170725 A1* | 6/2016 | Holton | ................... | G06F 8/433 |
| | | | | 717/157 |

OTHER PUBLICATIONS

De Sutter et al., "A Practical Interprocedural Dominance Algorithm," ACM Transactions on Programming Languages and Systems,vol. 29, No. 4,Article 19, Publication date: Aug. 2007.*

D'Souza, "nterprocedural Analysis: Sharir-Pnueli's Call-strings Approach," Sep. 4, 2013.*

Allen, "Control Flow Analysis," 1970.*

Stadler et al., "Partial Escape Analysis and Scalar Replacement for Java," Copyright 2014 ACM.*

Lee et al., "Global Variable Localization and Transformation for Hardware Synthesis from High-Level Programming Language Description," IEEE 2001.*

* cited by examiner

METHOD OF ADDING LOCAL VARIABLES IN PLACE OF GLOBAL IN JAVASCRIPT

FIELD AND BACKGROUND OF THE INVENTION

The present invention, in some embodiments thereof, relates to a computer implemented method of improving JavaScript code by adding local variables in place of global variables and, more specifically, but not exclusively, using a combination of multiple static inter procedural analysis methods to identify global variables. JavaScript™ is trademarked by ORACLE AMERICA, INC.

As technology advances and software intensive application become more abundant, software development is being done by a rapidly growing number of programmers who may have limited experience and may not be fully familiar with proper software development practices. Moreover, a lot of software practices used in certain environments, for example, Object Oriented Programming (OOP), web and/or server, may not fit platforms and applications of other nature, for example mobile platforms and/or Internet of Things (IoT). However software development practices may often be migrated from one software development environment to another. This migration may not be optimal at best and ineffective and/or harmful at worst.

In the case of JavaScript, which is a is a high-level, dynamic, untyped, and interpreted programming language, maintaining correct software engineering practices related to global variables can have a major positive impact on the JavaScript code life cycle, including development, debugging, integration, verification, deployment, upgrade and maintenance. Identifying poor programming at an early stage of the development process presents multiple benefits, for example, improving software code with respect to functionality and/or robustness, reduce implementation resources and/or reduce costs during one or more of the software product life cycle.

A common JavaScript software practice that negatively affects performance and maintainability is use of global variables in nested functions. Global variables can be accessed from anywhere in the code, allowing unintended changes to data. The referencing of a global variable takes more computing resources and time than referencing a local variable, since when executed JavaScript will first search for a variable in the local environment, and if not found continue to search elsewhere.

An important tool in ensuring good software engineering in JavaScript code is static analysis. The term static analysis as it relates to computer code typically refers to analysis of the instructions of a computer program that does not rely on the run-time execution of the application. One type of static analysis, known as inter procedural control flow graph, is a useful starting point in maintaining good JavaScript software engineering practices.

SUMMARY OF THE INVENTION

The present invention, in some embodiments thereof comprises a computer implemented method of detecting global variables in JavaScript code, and adding local variables in place of the global variables, comprising receiving a JavaScript code containing at least one of a plurality of globally defined functions, identifying at least one of: one or more confined global variables which receive a value within a first JavaScript scope wherein the value is not referenced outside of the first JavaScript scope, and one or more repeating global variables accessed repeatedly within a second JavaScript scope, and adding local variables in place of at least one of the confined global variables and the repeating global variables.

Optionally generating at least one code segment from the JavaScript code by a method that searches the text of the JavaScript code and identifies a JavaScript keyword and/or a JavaScript syntax of a beginning of the global function and a JavaScript keyword and/or a JavaScript syntax of an end of the global function, wherein each code segment comprises one of the global functions.

Optionally generating at least one call graph from each the code segments by a method selected from a static analysis JavaScript tool, for example Wala Javascript FrontEnd.

Optionally generating the control flow graph from each of the at least one call graph by one of a plurality of algorithms selected from a group consisting of but not restricted to Sharir-Pnueli call string approach and Computer Flow Analysis by Francis Allen.

Optionally generating the inter procedural dominator graph from each of the at least one inter procedural control flow graphs by one of a plurality of algorithms selected from a group consisting of but not limited to: a Aharon Abadi Yishai A. Feldman: "A Parallel On-Demand Algorithm for Computing Interprocedural Dominators" B. De Sutter, L. Van Put, and K. De Bosschere, "A practical interprocedural dominance algorithm," ACM Trans. Program. Lang. Syst., vol. 29, no. 4, August 2007.

Optionally identifying the referenced global variables and a JavaScript scope of the global variables within a node of the inter procedural dominator graph by a text search of the inter procedural dominator graph wherein JavaScript keywords and/or JavaScript syntax are used to identify references to global variables.

Optionally identifying a definition of the referenced global variable along the inter procedural dominator path, and identifying a scope of the location of the definition, by starting from the node containing the referenced global variable and searching along paths of the inter procedural dominator graph in a direction towards an entry node of the inter procedural dominator graph.

Optionally identifying at least one or more the confined global variables along the inter procedural dominator path.

Optionally altering the definition of the at least one confined global variable such that the confined global variable is defined as a local variable.

Optionally identifying at least one or more the repeating global variables along the inter procedural dominator graph.

Optionally defining a new local variable within the JavaScript scope of the repeating global variable, copying a value of the global variable into the new local variable prior to the multiple references to the global variable, replacing the global variable with the new local variable within the JavaScript scope, and copying a value of the new local variable into the global variable subsequent to the multiple references.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
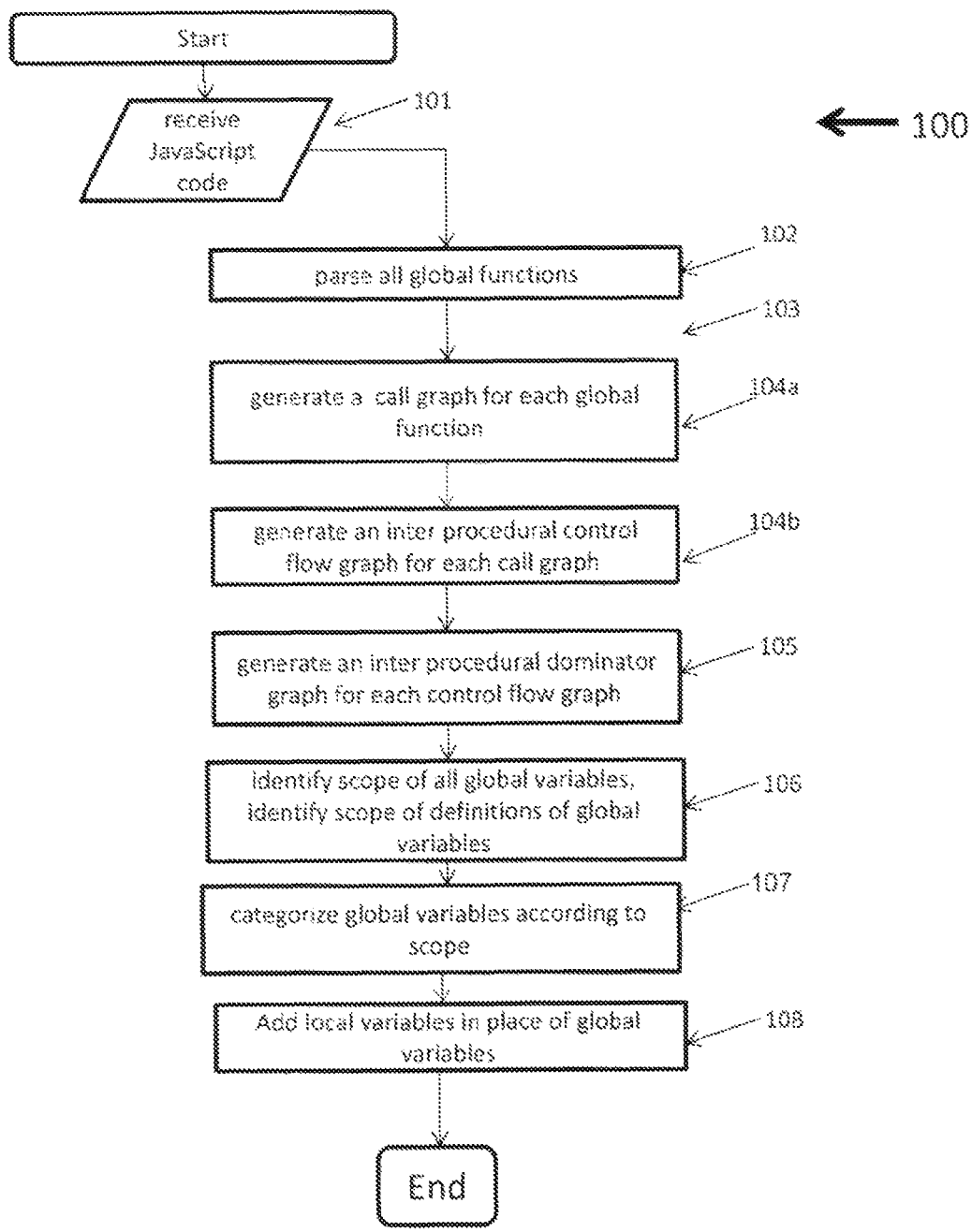
FIG. 1 is a flowchart of an exemplary process for identifying global variables and adding local variables in place of the global variables, according to some embodiments of the present invention.

The present invention, in some embodiments thereof, relates to a computer implemented method of identifying global variables in JavaScript code and adding local variables in place of global variables and, more specifically, but not exclusively, using a plurality of static inter procedural analysis methods to identify the global variables that may be transformed into local variables.

Global variables in JavaScript potentially create a plurality of unwanted behaviors. Referencing global variables requires more time and computer resources than referencing local variables. Another unwanted behavior of global variables is inability to isolate code segments. All code that is not designed to change a variable should not be allowed to access the variable, in order to avoid unwanted changes. Because global variables can be accessed from any point in a JavaScript program, it is difficult to isolate them from code that should not have access. JavaScript global variables in many manifestations are a software antipattern. According to some embodiments of the present invention, there are provided systems and methods for identifying JavaScript global variables and adding local variables in place of the global variables using automatic tools.

The present invention in some embodiments thereof, is based on a computerized process executed by processor(s) for identifying global variables employing one or more inter procedural analysis procedures on a designated static code. Static code refers to computer code in the form of a text file or document, and is distinct from code in the form of machine instructions that is executed by a processor. This allows categorizing the identified global variables at least as confined global variables or repeating global variables based on JavaScript scope by inter procedural analysis of the designated static code. JavaScript scope refers to a set of accessible variables, objects, and/or functions. Now, a plurality of definitions of local variables is automatically added to the static code so as to be used in place of the global variables according to the established categories. The end result is a JavaScript code that when executed consumes less computing resources and reduced likelihood of unintended and/or obscure behavior.

It should be noted that JavaScript scope refers to the ability of functions to access variables, and it should be further noted that JavaScript allows nested functions. Functions have a JavaScript scope that includes access to variables declared within the function, and access to all variables declared in parent functions (if the function is nested) up to and including the global function, and variables declared in the global scope. JavaScript scope does not allow parent functions to access variables defined in the nested functions of the parent function. As a result, JavaScript scope is hierarchical, with each nested function having a more broad scope than the corresponding parent function.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1 which is a flowchart of an exemplary process 100 for identifying global variables that may be transformed into local variables and adding local variables in place of global variables, according to some embodiments of the present invention. The exemplary process 100 is executed by one or more processors for engineering JavaScript code, for instance as an independent tool or a tool integrated in a Development Environment such as an Integrated Development Environment (IDE) or a cloud service. This allows a programmer to automatically create code that benefits from the advantages of local variables over global variables.

As shown in 101, a JavaScript code is designated for an analysis. The software code may be manually designated by one or more users employing a user interface (UI) executed on an input module of a processing node integrating non-transitory medium for storing code instructions. The UI may be implemented through a plurality of human-machine interfaces, for example, an IDE, text interface, graphical user interface (GUI) and/or audio interface. The software code may be automatically designated by a quality assurance and/or improvement process that is executed on a code store comprising the software code.

As show in 102 the JavaScript code is parsed by a computer parsing process such that a separate code segment is generated for each global function. Global functions are functions that are defined in the JavaScript global scope. The Global functions may be parsed from a JavaScript code by a standard computer parsing process executed on a processor that searches word patterns in the JavaScript code and extracts functions defined within the global scope, for example JavaScript Mozilla Rhino parser.

As will be described below, each global function may be analyzed utilizing a plurality of methodologies of inter procedural analysis of static code in order to identify global variables that can be replaced with local variables, the methodologies comprising call graph analysis, inter procedural control flow analysis, inter procedural dominator graph analysis, identifying a scope of definition of variables and identifying a scope of references to variables.

For many computer languages, there is only a single possible target code from a static code. However, since JavaScript is a dynamic computer language, a plurality of target codes is possible from a single JavaScript static code. For this reason, generating the control flow graph, which is a static analysis based on target code, may result in a plurality of possible control flow graphs stemming from a plurality of possible target codes. As shown in 103, optionally one or more call graphs are generated for each global function. A static analysis tool, for example the WALA JavaScript frontend, may be used to build the call graph.

As shown in 104a and 104b, optionally an inter procedural control flow graph is generated for each call graph. The inter procedural control flow graph of a computer code represents the order in which individual statements, instructions or function calls of a program are executed or evaluated by a processor.

Inter procedural control flow graphs may be generated according to the call-string approach as described in "Two Approaches to Interprocedural Analysis" by Micha Sharir and Amir Pnueli which is incorporated herein by reference, control flow analysis as described in "Control Flow Analysis" by Francis Allen which is incorporated herein by reference, and/or any other methodology that represents the flow control of the code in the following manner: a inter procedural control flow graph is comprised of nodes, edges, and connections. Nodes represent a series JavaScript function statements that are executed without interruption. Nodes have edges, which are points of connection between different nodes, indicating a jump in the control flow. Connections represent program flow between nodes, for example a connection between a node calling a nested function and a node representing function statements of the called nested function. The functions may be global function and/or nested functions of a global function. Each invocation of a function is represented by two nodes: a call node and a resume node. The call node is connected by a call edge to the entry of the called function, and the resume node has an incoming return edge from the exit of the called function. The entry nodes may have multiple incoming call edges, and exit nodes may have multiple outgoing return edges. The inter procedural control flow graph may be applied to code that does not terminates without returning from all function calls.

As shown in 105, optionally an inter procedural dominator graph is generated for each inter procedural control flow graph. The inter procedural dominator graph, a type of tree graph, includes all the nodes of the inter procedural control flow graph but only the paths that include connections to or from a dominant node. A dominator path, as used herein, is a path on an inter procedural dominator graph comprising one or more nodes and a series of connections that connect between a dominating node and any other node. A first node dominates a second node when every path to the second node from the entry point of the inter procedural control flow graph must go through the first node. An inter procedural dominator graph may be generated using various algorithms, for example Aharon Abadi and Yishai A. Feldman: "A Parallel On-Demand Algorithm for Computing Interprocedural Dominators" which is incorporated herein by reference, and K. De Bosschere: "A Practical Interprocedural Dominance Algorithm," ACM Trans. Program. Lang. Syst., vol. 29, no. 4, August 2007 which is incorporated herein by reference.

As shown in 106 optionally variables are identified in nodes in each inter procedural dominator graph. All nodes with referenced variables in the inter procedural dominator graph are traced along the node edges in the opposite direction of the flow of execution of the code to find the definition of the variable. All inter procedural control flow graphs are searched to identify any references to the variable. The search for references to variables may be performed any search engine or Javascript parsing utility that is capable of searching for keywords and/or JavaScript syntax, for example JavaScript Mozilla Rhino parser.

As explained above, JavaScript scope is defined by functions, so the scope of the location of a definition of a global variable is the scope of the function within which the global variable is defined. A standard computer parsing process executed on a processor may be used to search word patterns in code and extract both the location of the definition and the function in which the definition occurs.

As shown in 107, the variables fit into one of a plurality of possible categories, comprising local variable, confined global variable, and repeating global variable.

The variable is categorized as a local variable when the variable is defined as a local variable within the global function.

The variable is categorized as a confined global variable when the variable is defined as global, and within a scope, referred to herein as Scope A, the global variable receives a value only from within Scope A, and the value of the global variable is not referenced outside Scope A.

The variable is defined as a repeating global variable when the global variable is referenced repeatedly within a given scope, for example, the global variable is accessed repeatedly within a block of code dominated by a "do while" conditional expression.

The UI may be used to determine a minimum number of times a global variable is accessed within a conditional expression for the global variable to be categorized as a repeating global variable.

As shown in 108 local variables are added in place of global variables. For each of one or more repeating global variables identified within a global function, a new local variable is defined in the scope of the repeating global prior to the repeated access to the repeating global variable, and assigned the value of the repeating global variable. The repeating global variable is deleted within the local scope, and the new local variable is inserted in place of the deleted global variable Immediately after the multiple references to the new local variable, the value of the new local variable is copied into the repeating global variable.

For each confined global variable identified within a given global function, the definition of the global variable is altered such that the variable is defined as a local variable.

For variables categorized as local, no further actions are needed.

Figure 2:
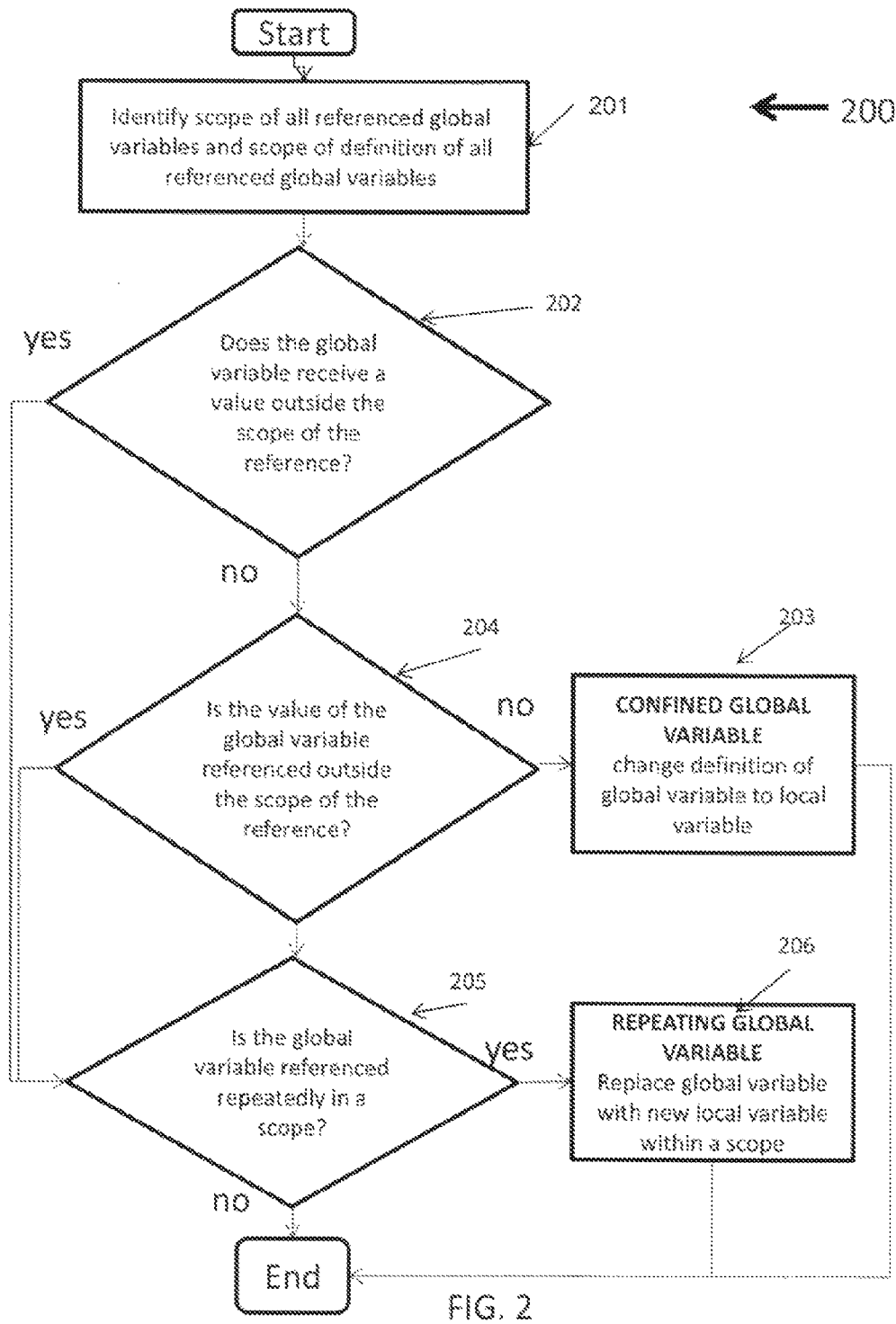
FIG. 2 is a flowchart of an exemplary process for deciding how to define the local variables that are added in place of global variables, according to some embodiments of the present invention.

Reference is now made to FIG. 2 which is a flowchart of an exemplary method for identifying local variables to be added in place of global variables, according to some embodiments of the present invention. As shown in 201, a process 200 begins with the output of 106 as seen in FIG. 1, which is the JavaScript scope of all referenced global variables and the JavaScript scope of the definition of all referenced global variables. Process 200 is repeated for each instance of a global variable for a target code of an inter procedural dominator graph.

As shown in 202, an instance of a global variable at a location, referred to herein as Location 1, and with a defined value referred to herein as Value 1, is inspected. When Value 1 is not received from outside scope of Location 1, this instance of the global variable is now inspected according to 204.

As shown in 204, the global variable is inspected to discover any references to the global variable containing Value 1. When the Value 1 is not referenced outside the scope of Location 1, this instance of the global variable is a confined global variable.

As shown in 203, when the global variable is a confined global variable, the global variable is redefined as a local variable.

As shown in 205, any global variable that is not a confined global variable is inspected. When the global variable is referenced within a scope more than a minimum number of times, the global variable is a repeating global variable. As described above, the minimum number of times may be specified by a user via the UI.

As shown in 206, for every repeating global variable a new local variable is defined immediately prior to the multiple access to the global variable, and the value of the global variable is copied into the new local variable Immediately subsequent to the last of the multiple accesses to the new local variable, the value of the new local variable is copied into the global variable, and the new local variable is deleted.

Figure 3:
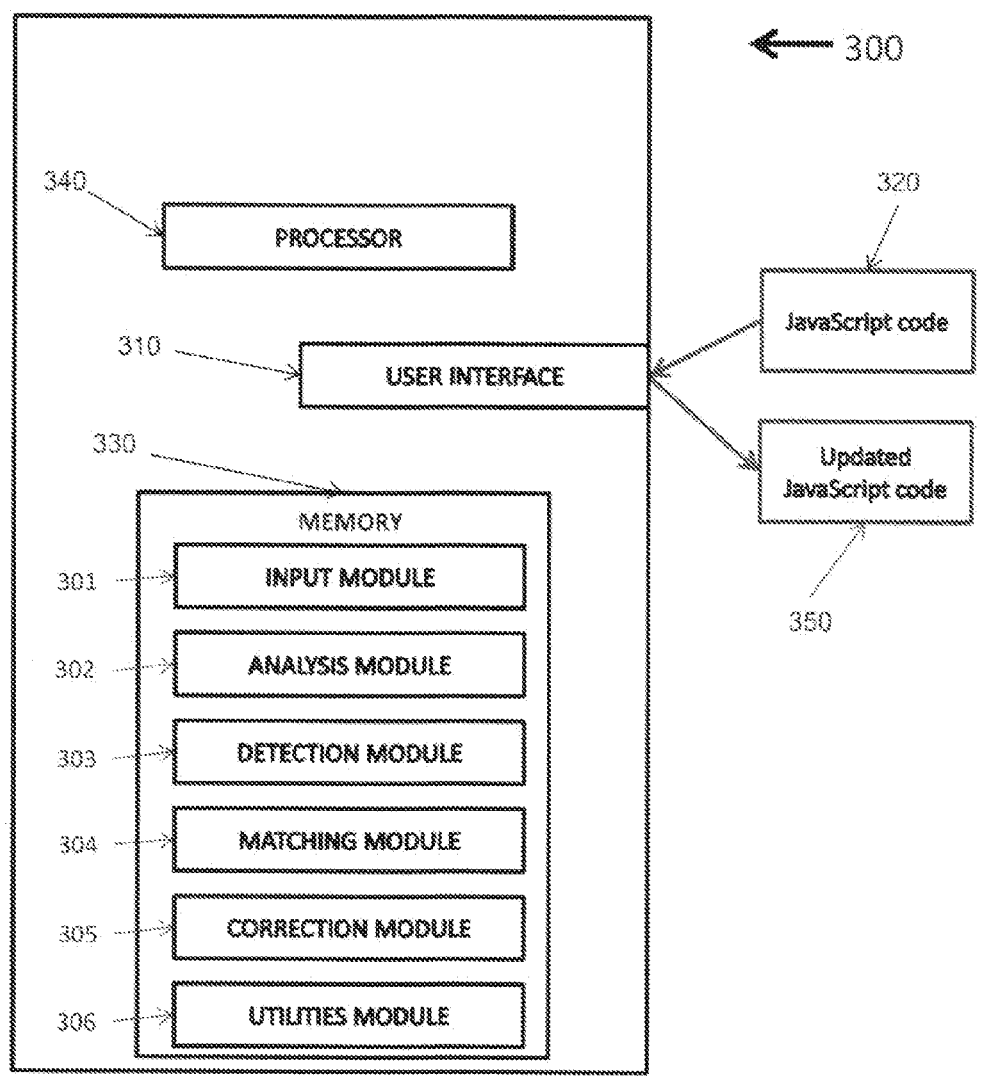
FIG. 3 is a schematic illustration of an exemplary system for identifying global variables and adding local variables in place of the global variables, according to some embodiments of the present invention.

Reference is now made to FIG. 3 which is a schematic illustration of an exemplary system 300 for implementing a method of identifying global variables and adding local variables in place of the global variables, for example as depicted in FIG. 1, according to some embodiments of the present invention. The schematic illustration depicts a computer system comprising a user interface (UI) 310 for receiving a JavaScript code 320, a memory 330 for storing instructions, and at least one processor 340 for executing the instructions, according to some embodiments of the present invention The input module 301 may consist of a UI, a communication link to communicate with one or more remote servers to retrieve JavaScript code and/or an interface to retrieve the one or more JavaScript code segments from a non-transitory medium integrated in system 300. The UI may be implemented through a plurality of human-machine interfaces, for example, text interface, graphical user interface (GUI) and/or audio interface. For example, the GUI may present one or more users a visual input/output (I/O) interface displayed on a screen coupled with input devices, such as, keyboard, pointing device, audio input through a microphone and the likes.

The instructions stored in the memory comprises an input module 301, an analysis module 302, a detection module 303, a matching module 304, a correction module 305, and utilities module 306, wherein a module refers to a plurality of program instructions stored in a non-transitory medium and executed by a processor.

Input module 301 receives a JavaScript code 310 from UI 310, and parses the JavaScript code into one or more code segments, each segment comprising one global function, as shown in 102. Input module 301 further identifies at least one target code, and optionally a plurality of target codes, as shown in 103.

Analysis module 302 generates from each target code one or more call graphs, generates from each call graph an inter procedural control flow, and generates from each inter procedural control flow graph a dominator graph, as shown in 105. Detection module 303 identifies global variables, the scope of the definition of the global variables, and the scope of the references to the global variables, as shown in 106 and 107. Matching module 304 assigns the global variables to categories, either repeating global variables or confined global variables, as shown in 107. Correction module 305 adds local variables in place of the global variables, as shown in 108. The process of identifying global variables and adding local variables in their place is performed by the system 300 for each of one or more code segments comprising the code 320. After all code segments have been processed by system 300 an updated JavaScript code 350 is delivered by UI 310 to the same location as the original JavaScript code.

Some embodiments of the present invention are provided by means of examples. An exemplary code segment presenting an exemplary confined global variable and a recommended approved pattern to replace the antipattern is described in code excerpts 1 and 2. Code excerpt 1 describes a code fragment that may be identified through the detection system 200.

Code excerpt 1:

```
function f( ){
    function h( ){
        g( );
    }
    function g( ){
        alert(x);
    }
    x=3;
    h( );
    g( );
    h( );
}
```

Figure 4:
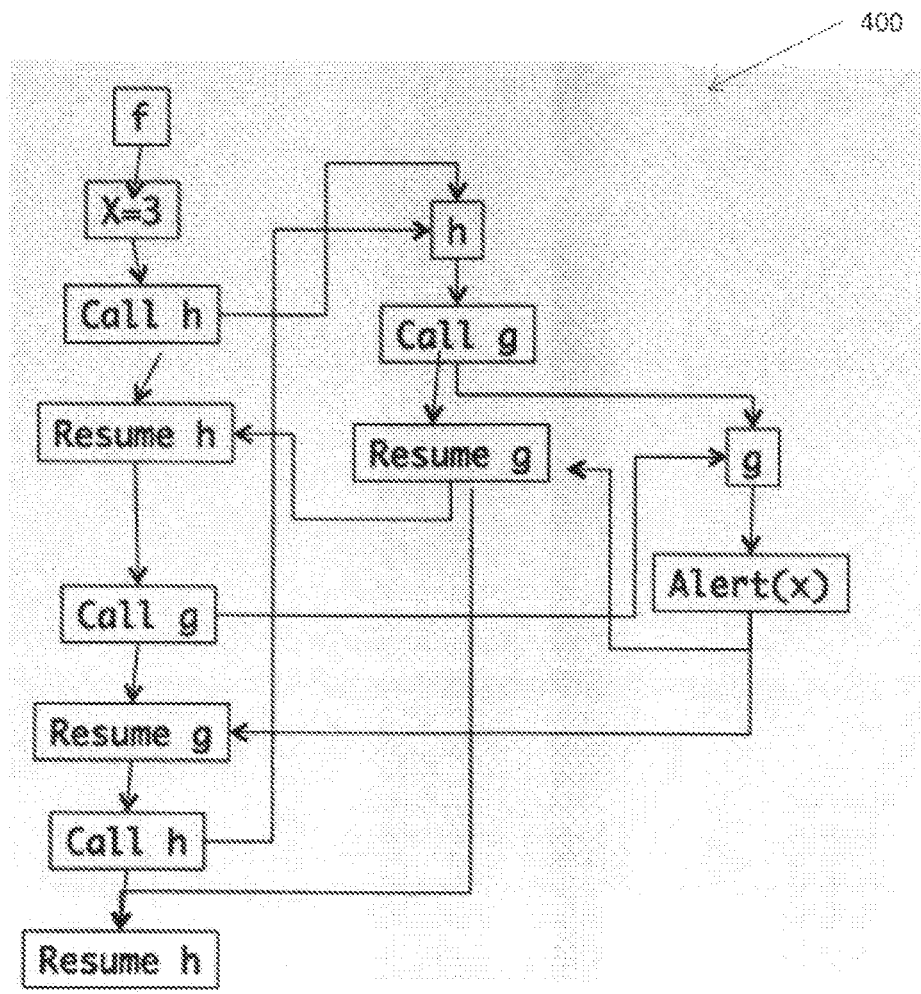
FIG. 4 is a inter procedural control flow graph of an exemplary code excerpt, according to some embodiments of the present invention.

Reference is now made to FIG. 4 which is an inter procedural control flow graph 400 of exemplary code excerpt 1, according to some embodiments of the present invention. FIG. 4 shows the inter procedural control flow graph generated from Code excerpt 1, according to the methods described above in 102, 103, and 104a and 104b.

Figure 5:
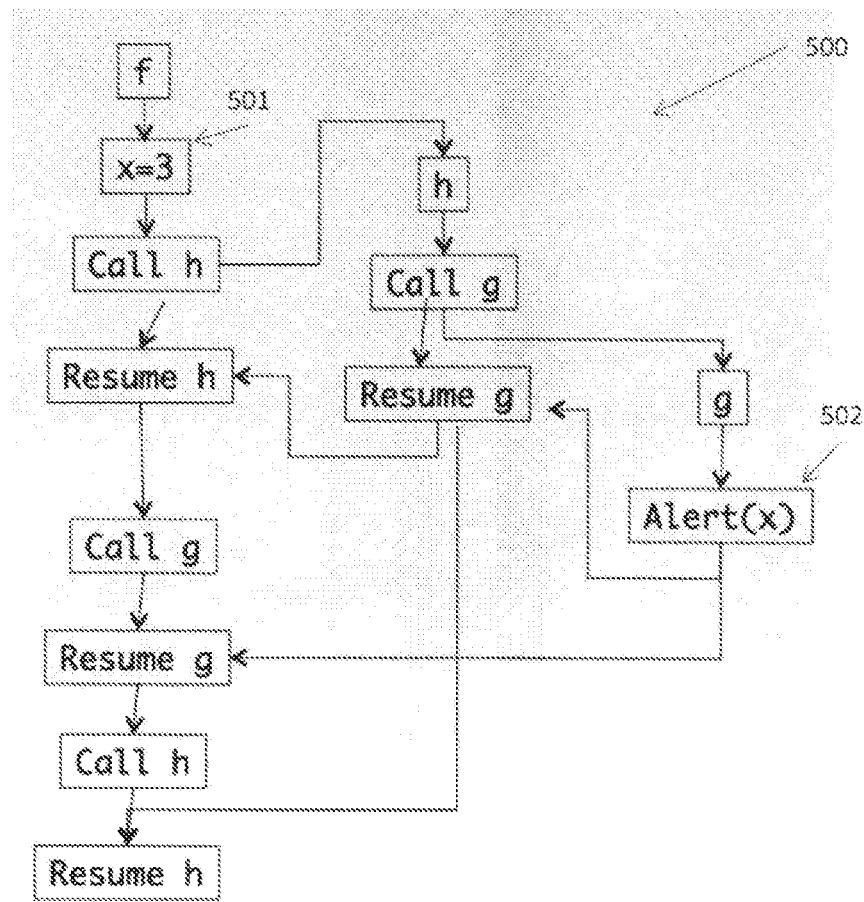
FIG. 5 is an inter procedural dominator graph of an exemplary inter procedural control flow graph, according to some embodiments of the present invention.

Reference is now made to FIG. 5 which is an inter procedural dominator graph 500 of an exemplary inter procedural control flow graph, according to some embodiments of the present invention. The inter procedural dominator graph in FIG. 5 was generated from the control flow shown in FIG. 4, according to the methods described above in 105. 502 is a reference to the variable "x". The definition of "x" as a global variable is found at 501 by using the method described above in 106. It should be noted that JavaScript variables defined within a function are automatically global variables unless specifically defined as a local variable. Using the method described above in 107, "x" is categorized as a confined global variable. Using the method described above in 108 and 205, the code line "x=3" in Code excerpt 1 is changed to "var x=3", thereby adding a local variable in place of a global variable, as shown in Code excerpt 2.

Code excerpt 2:

```
function f( ){
    function h( ){
        g( );
    }
    function g( ){
        alert(x);
    }
    var x=3;
```

Code excerpt 2:

```
    h( );
    g( );
    h( );
}
```

A second exemplary code segment presenting an exemplary confined global variable and a recommended approved pattern to replace the anti pattern is described in code excerpts 3 and 4. Code excerpt 1 describes a code fragment that may be identified through the detection system 200.

Code excerpt 3:

```
//some file
function f( ){
    l1: var myObject = function ( ) {
    value = 0;
    return {
    increment: function ( ) {
        value += 1;             l2:
    },
    getValue: function ( ) {
    return value;
    }
    };
        }( );
    //some code
    l3: myObject.increment( );
}
f( );
```

In Code Excerpt 3 "myObject" points to an object that contains the function "increment". At location L1 "value" is defined as a global variable. At location L2 the increment function accesses the global variable "value".

The call to the top function of "myObject" is in location L1 and the initialization of the variable "value" is in this location inside function f. The call to increment is in location L3 inside function f. Location L3 is dominated by L1 and therefore by the definition of value. It follows that value=0 is an ancestor of L2 in the inter procedural dominator graph. As shown in 205 the definition of global variable "value" is changed such that "value" is defined as a local variable and "value=0" will be change to "var value=0". Code excerpt 4 shows the code excerpt 3 after adding the local variable in place of the global variable.

Code excerpt 4:

```
//some file
function f( ){
    l1: var my Object = function ( ) {
    var value = 0;
    return {
    increment: function ( ) {
        value += 1;             l2:
    },
    getValue: function ( ) {
    return value;
    }
    };
        }( );
    //some code
    l3: myObject.increment( );
}
        f( );
```

Code excerpt 5 is another exemplary code wherein a contained global variable is identified and a local variable may be added in place of the global variable.

Code excerpt 5:

```
function f2(y){
    function g( ){
        x=x+3;
    }
    x=1
    g( );
}
f2( );
```

In Code excerpt 5 the global variable "x" may be replaced with a local variable, as shown in code excerpt 6:

Code excerpt 6:

```
function f2(y){
    function g( ){
        x=x+3;
    }
    var x=1;
    g( );
}
f2( );
```

The following code excerpt 7 includes an example of a repeating global variable. As seen in L5, a JavaScript key word "for" generates a loop wherein the global variable "x" at L6 is accessed 1,000,000 times. As mentioned above, access to global variables consumes more computing resources than local variables.

Code Except 7

```
{
L1:   x=1
L2:       print(X)
}
{
L3:   x=2
L4:       print(X)
}
{
L5        for(var i=0;i<1000000;i++{
L6:           Print(x)
              x++
        }
}
```

As seen in code excerpt 8, at L5 a new local variable, "x_local" is defined and receives the value from global variable "x". At L6 and L7 global variable "x" has been replaced with new local variable "x_local", and at L8 global variable "x" receives a value from new local variable "x_local".

Code Except 8

```
{
L1:   var x=1
L2:       print(X)
}
{
L3:   x=2
L4:       print(X)
}
```

Code Except 8

```
{
L5:       var x_local = x;
          for(var i=0;i<1000000;i++{
L6:           Print(x_local)
L7:           x_local ++
          }
L8:   x= x_local;
}
```

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant computer systems will be developed and the scope of the term computer system is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method of detecting global variables in JAVASCRIPT code, and adding local variables in place of said global variables, comprising:
    receiving by a processor a JAVASCRIPT code containing at least one of a plurality of globally defined functions;
    generating by the processor at least one call flow graph for each one of said at least one of globally defined functions;
    generating by the processor an inter-procedural control flow graph for each one of said call flow graph;
    generating by the processor an inter-procedural dominator graph for each one of said inter-procedural control flow graph;
    identifying by the processor each of referenced global variables within each of said inter-procedural dominator graph and determining a JAVASCRIPT scope of each of referenced global variables;
    identifying by the processor at least one of: one or more confined global variables which receive a value within a first JAVASCRIPT scope of each referenced global variable wherein said value is not referenced outside of said first JAVASCRIPT scope, and one or more repeating global variables accessed repeatedly within a second JAVASCRIPT scope of each referenced global variable; and
    automatically adding by the processor local variables in place of at least one of said confined global variables and said repeating global variables.

2. The method of claim 1, further comprising generating at least one code segment from said JAVASCRIPT code by identifying a JAVASCRIPT keyword and/or a JAVASCRIPT syntax of a beginning of said globally defined functions and a JAVASCRIPT keyword and/or a JAVASCRIPT syntax of an end of said globally defined functions, wherein each code segment comprises one of said globally defined functions.

3. The method of claim 1, further comprising generating the at least one call flow graph from each code segment by a static analysis JAVASCRIPT tool.

4. The method of claim 1, further comprising generating said control flow graph from each of said at least one call flow graph by one of a plurality of algorithms selected from a group consisting of Sharir-Pnueli call string and Computer Flow Analysis.

5. The method of claim 1, further comprising generating said inter-procedural dominator graph from each of said at least one inter-procedural control flow graphs by one of a plurality of algorithms selected from a group consisting of a parallel on-demand algorithm and a practical inter-procedural dominance algorithm.

6. The method of claim 1, further comprising identifying said JAVASCRIPT scope of said referenced global variables within a node of said inter-procedural dominator graph by a text search of said inter-procedural dominator graph wherein JAVASCRIPT keywords and/or JAVASCRIPT syntax are used to identify references to global variables.

7. The method of claim 1, further comprising identifying a definition of said referenced global variables along said inter-procedural dominator path, and identifying a scope of location of said definition, by starting from a node containing said referenced global variables and searching along paths of said inter-procedural dominator graph in a direction towards an entry node of said inter-procedural dominator graph.

8. The method of claim 1, further comprising identifying at least one or more of said confined global variables along paths of said inter-procedural dominator path.

9. The method of claim 1, further comprising altering a definition of at least one confined global variable of said confined global variables such that said at least one confined global variable is defined as a local variable.

10. The method of claim 1, further comprising identifying at least one or more of said repeating global variables along paths of said inter procedural dominator graph.

11. The method of claim 1, further comprising defining a new local variable within said second JAVASCRIPT scope of said repeating global variables, copying a value of said repeating global variables into said new local variable prior to multiple references to said repeating global variables, replacing said repeating global variables with said new local variable within said second JAVASCRIPT scope, and copying a value of said new local variable into said repeating global variables subsequent to said multiple references.

12. A system for detecting and replacing global variables in code, comprising:
    one or more non-transitory computer-readable storage media, and program instructions stored on at least one of the one or more storage media; and
    a hardware processor for executing the program instructions, the program instructions comprising:
        code instructions for receiving a JAVASCRIPT code having at least one of a plurality of globally defined functions, said JAVASCRIPT code is received according to a user input received via an interface and generating at least one code segment for each globally defined function in said JAVASCRIPT code;
        code instructions for generating at least one call flow graph for each one of said at least one of globally defined functions;

code instructions for generating an inter-procedural control flow graph for each one of said call flow graph;

code instructions for generating an inter-procedural dominator graph for each one of said inter-procedural control flow graph;

code instructions for identifying each of referenced global variables within each of said inter-procedural dominator graph and determining a JAVASCRIPT scope of each of said referenced global variables;

code instructions for identifying at least one of: one or more confined global variables which receive a value within a first JAVASCRIPT scope of each of said referenced global variables wherein said value is not referenced outside of said first JAVASCRIPT scope, and one or more repeating global variables accessed repeatedly within a second JAVASCRIPT scope of each of said referenced global variables; and code instructions for automatically adding local variables in place of said repeating global variables or said confined global variables.

13. The system of claim 12, further comprising code instructions for identifying a definition of said each referenced global variable along paths of said inter-procedural dominator path, and identifying a scope of a location of said definition, by starting from a node containing said each referenced global variable and searching along paths of said inter-procedural dominator graph in a direction towards an entry node of said inter-procedural dominator graph.

14. The system of claim 12, further comprising code instructions for identifying at least one or more of said confined global variables, along paths of said inter-procedural dominator path.

15. The system of claim 12, further comprising code instructions for altering a definition of at least one confined global variable of said confined global variables such that said at least one confined global variable is defined as a local variable.

16. The system of claim 12, further comprising code instructions for identifying at least one or more of said repeating global variables along paths of said inter-procedural dominator graph.

17. The system of claim 12, further comprising code instructions for defining a new local variable within said second JAVASCRIPT scope of said repeating global variables, copying a value of said repeating global variables into said new local variable prior to multiple references to said repeating global variables, replacing said repeating global variables with said new local variable within said second JAVASCRIPT scope, and copying a value of said new local variable into said repeating global variables subsequent to said multiple references.

18. A computer program product for replacing JAVASCRIPT global variables with local variables in a software code to optimize usage of computing resources, comprising:

a non-transitory computer readable storage medium;

first program instructions for receiving a JAVASCRIPT code having at least one of a plurality of globally defined functions;

second program instructions for generating at least one call flow graph for each one of said at least one of globally defined functions;

third program instructions for generating an inter-procedural control flow graph for each one of said call flow graph;

fourth program instructions for generating an inter-procedural dominator graph for each one of said inter-procedural control flow graph;

fifth program instructions for identifying each of referenced global variables within each of said inter-procedural dominator graph and determining a JAVASCRIPT scope of each of said referenced global variables;

sixth program instructions for identifying at least one of: one or more confined global variables which receive a value within a first JAVASCRIPT scope wherein said value is not referenced outside of said first JAVASCRIPT scope, and one or more repeating global variables accessed repeatedly within a second JAVASCRIPT scope; and seventh program instructions for automatically adding local variables in place of said repeating global variables and/or said confined global variables; and wherein said first, second, third, fourth, fifth, sixth, and seventh program instructions are executed by at least one processor from said non-transitory computer readable storage medium.

19. The computer program of claim 18, further comprising program instructions for identifying at least one or more of said repeating global variables along paths of said inter-procedural dominator graph.

20. The computer program of claim 18, further comprising program instructions for defining a new local variable within said second JAVASCRIPT scope of said repeating global variables, copying a value of said repeating global variables into said new local variable prior to multiple references to said repeating global variables, replacing said repeating global variables with said new local variable within said second JAVASCRIPT scope, and copying a value of said new local variable into said repeating global variables subsequent to said multiple references.

* * * * *